(12) United States Patent
Skszek et al.

(10) Patent No.: US 10,814,390 B2
(45) Date of Patent: Oct. 27, 2020

(54) TAILORED MATERIAL PROPERTIES USING INFRARED RADIATION AND INFRARED ABSORBENT COATINGS

(71) Applicant: MAGNA INTERNATIONAL INC., Aurora (CA)

(72) Inventors: Timothy Walter Skszek, Saline, MI (US); Xiaoping Niu, Richmond Hill (CA); Thomas James Oetjens, Troy, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 386 days.

(21) Appl. No.: 15/556,098

(22) PCT Filed: Mar. 2, 2016

(86) PCT No.: PCT/US2016/020335
§ 371 (c)(1),
(2) Date: Sep. 6, 2017

(87) PCT Pub. No.: WO2016/144626
PCT Pub. Date: Sep. 15, 2016

(65) Prior Publication Data
US 2018/0056388 A1 Mar. 1, 2018

Related U.S. Application Data

(60) Provisional application No. 62/129,244, filed on Mar. 6, 2015, provisional application No. 62/274,506, filed on Jan. 4, 2016.

(51) Int. Cl.
*B05D 5/08* (2006.01)
*B32B 7/02* (2019.01)
(Continued)

(52) U.S. Cl.
CPC .......... *B22F 3/105* (2013.01); *B05C 5/00* (2013.01); *B05D 5/08* (2013.01); *B05D 7/14* (2013.01);
(Continued)

(58) Field of Classification Search
CPC ... B05D 5/08; B05D 7/14; B05D 5/00; B05D 2701/00; F02F 1/00; B05C 5/00; B22F 3/105; B22F 2003/1052; F16J 10/00
(Continued)

(56) References Cited

U.S. PATENT DOCUMENTS

| 4,840,852 A | 6/1989 | Hyland et al. |
| 5,723,187 A | 3/1998 | Popoola et al. |

(Continued)

FOREIGN PATENT DOCUMENTS

| CN | 1696055 A | 11/2005 |
| CN | 103097470 A | 5/2013 |

(Continued)

OTHER PUBLICATIONS

Hekmatara, H., et al.; Microwave absorption property of aligned MWCNT/Fe3O4; Journal of Magnetism and Magnetic Materials; 2013; pp. 186-191.
(Continued)

*Primary Examiner* — Quang T Van
(74) *Attorney, Agent, or Firm* — Dickinson Wright PLLC (57) ABSTRACT

A method of manufacturing a structural component having tailored material properties by applying an IR-absorbent coating to a substrate formed of a ferrous-based, aluminum-based, magnesium-based, or fiber reinforced composite material is provided. The coating is preferably formed of iron oxide ($Fe_3O_4$) decorated multiwall carbon nanotubes. Alternatively, the coating is wax-based or polymer-based and includes TriSilanollsooctylt POSS and additives. Dif-
(Continued)

Automotive Vehicle Application ferent coating compositions may be applied to different zones of the substrate so that the emissivity coefficient varies along the substrate. The coated substrate is heated and formed between a pair of dies to achieve a complex shape or features. The IR-absorbent coating increases the infrared absorption rate during the heating step, which improves formability of the substrate. The iron oxide ($Fe_3O_4$) decorated multiwall carbon nanotubes can also be applied to an engine component to increase the thermal efficiency of the engine by reducing friction and enabling the use of light weight materials.

18 Claims, 8 Drawing Sheets

(51) Int. Cl.
| | |
|---|---|
| B22F 3/105 | (2006.01) |
| B05D 7/14 | (2006.01) |
| F16J 10/00 | (2006.01) |
| B05C 5/00 | (2006.01) |
| F02F 1/00 | (2006.01) |
| B05D 5/00 | (2006.01) |

(52) U.S. Cl.
CPC ............... *F02F 1/00* (2013.01); *F16J 10/00* (2013.01); *B05D 5/00* (2013.01); *B05D 2701/00* (2013.01); *B22F 2003/1052* (2013.01)

(58) Field of Classification Search
USPC ....... 219/609, 610, 615, 635, 645, 646, 647; 148/417, 439, 697, 534; 428/654, 212; 427/558, 559, 532; 118/642
See application file for complete search history.

(56) References Cited

U.S. PATENT DOCUMENTS

| | | |
|---|---|---|
| 5,958,521 A | 9/1999 | Zaluzec et al. |
| 6,293,134 B1 | 9/2001 | Johnson |
| 6,720,078 B1* | 4/2004 | Isizuka .................... B05D 7/51 |
| | | 428/341 |
| 2005/0230560 A1 | 10/2005 | Glatkowski et al. |
| 2005/0255313 A1 | 11/2005 | Kyotani et al. |
| 2007/0066714 A1* | 3/2007 | Xia ..................... B29C 49/0005 |
| | | 523/200 |
| 2010/0227082 A1 | 9/2010 | Fan et al. |
| 2011/0132052 A1 | 6/2011 | Faderl |
| 2012/0046379 A1 | 2/2012 | Keddie et al. |
| 2013/0200300 A1 | 8/2013 | Do et al. |

FOREIGN PATENT DOCUMENTS

| | | |
|---|---|---|
| CN | 105338799 A | 2/2016 |
| CN | 105462176 A | 4/2016 |
| DE | 10162415 A1 | 7/2003 |
| JP | 2016133520 A * | 7/2016 |

OTHER PUBLICATIONS

Brooke, Lindsay; Ford launches plasma-sprayed cylinder bores on 2011 Shelby V8; SAE International; Feb. 17, 2010; http://articles.sae.org/7524/.

Department of Energy (DOE) Office of Energy Efficiency and Renewable Energy (EERE) "Fiscal Year (FY) 2016 Vehicle Technologies Program Wide Funding Opportunity Announcement"— Funding Opportunity Announcement (FOA) No. DE-FOA-0001384.

Supplementary European Search Report Regarding European Application No. EP 16 76 2144 dated Sep. 11, 2018.

Antoni Iskra et al: Comparing the Resistance to Motion of Pistons Coated With a Layer of Nanotubes With Standard Pistons, Journal of Kones Internal Combustion Engines, vol. 19, No. 2, 2012, pp. 227-233.

Chen Ming-Dong, Research Progress in Preparation and Electromagnetic Properties of Carbon Nanotubes and Metal Oxides Coating, Feb. 20, 2015, Issue 2, pp. 18-23, Modem Chemical Industry.

* cited by examiner

TAILORED MATERIAL PROPERTIES USING INFRARED RADIATION AND INFRARED ABSORBENT COATINGS

CROSS REFERENCE TO RELATED APPLICATIONS

This U.S. National Stage Patent Application claims the benefit of PCT International Patent Application Serial No. PCT/US2016/020335 filed Mar. 2, 2016 entitled "Tailored Material Properties Using Infrared Radiation And Infrared Absorbent Coatings" which claims the benefit of U.S. Provisional Patent Application Ser. No. 62/129,244 filed on Mar. 6, 2015 entitled "Tailored Material Properties Using Infrared Radiation And Infrared Absorbent Coatings" and also claims the benefit of U.S. Provisional Patent Application Ser. No. 62/274,506 filed on Jan. 4, 2016 entitled "Enhanced Infrared Radiation Absorption Using Aligned Iron Oxide Decorated Multiwall Carbon Nanotubes", the entire disclosures of the applications being considered part of the disclosure of this application and hereby incorporated by reference.

BACKGROUND OF THE INVENTION

1. Field of the Invention

The invention relates generally to a system and method for manufacturing an automotive component with tailored material properties, and a component including tailored material properties.

2. Related Art

Automotive components for passenger vehicles, such as body panels, beams, pillars, and rails, are oftentimes formed into thin and complex or intricate shapes. Increasing the temperature and reducing the friction coefficient of a sheet metal substrate during the forming process has been found to enable a reduction in thickness of the substrate, and has also been found to increase the feasibility of fabricating components having intricate or complex shapes. For example, lightweight automotive components with a tight radii or a low R/t ratio can be achieved. Automotive components comprising shapes that require a significant amount of uniform elongation to avoid localized thinning and fracture of the sheet substrate during forming, such as sheet substrates having a high R value, can also be achieved.

One method used to achieve such components includes heating a lubricated ferrous-based, aluminum-based, or magnesium-based substrate in an electric platen-style oven by conductive heat transfer, and then transferring the heated substrate to a press-forming apparatus wherein the heated substrate is formed between a pair of steel stamping dies. Alternatively, the substrate could be heated by convection, induction, or radiant heat. The substrate is lubricated before the heating and forming steps to reduce the friction coefficient between the substrate and die surfaces and to avoid oxidation of the surface. According to this example method, a wax-based lubricant is applied to the substrate and dried in an off-line operation, so that the solvent evaporates before heating the substrate in the conduction oven and forming the substrate between conventional steel stamping dies.

Oftentimes, high heating temperatures, such as temperatures exceeding 270° C., are needed to achieve the complex and/or intricate shapes during the forming step. However, wax-based lubricants typically sublime or auto-ignite at a temperature less than 270° C., which limits the preheating or heating temperature to approximately 270° C. or less.

SUMMARY OF THE INVENTION

One aspect of the invention provides for an improved method of manufacturing a component with tailored material properties and without surface damage. The method first includes applying an infrared-absorbent (IR-absorbent) coating having an emissivity coefficient ranging from $0.8\varepsilon$ to $0.98\varepsilon$ to the surface of a substrate formed of a metal material, wherein the metal material of the substrate is selected from a ferrous-based material, aluminum-based material, magnesium-based material, and fiber reinforced composite material. The method next includes heating the coated substrate with an IR heat source; and forming the heated and coated substrate between a pair of dies.

Preferably, the IR-absorbent coating applied to the surface of the substrate includes iron oxide ($Fe_3O_4$) decorated multiwall carbon nanotubes. Alternatively, the IR-absorbent coating can be formed of a wax-based or polymer-based material including a surfactant and additives. The coating can also be formulated with at least one organic component which oxidizes at elevated temperature. The at least one organic component allows for removal of the coating from the surface of the substrate with minimal effort, and without the use of a highly acidic or highly basic pH composition.

The method of the present invention provides numerous advantages compared to other methods used to achieve tailored material properties. First, the composition of the IR-absorbent coating allows for increased temperatures, for example temperatures greater than 270° C., during the heating and forming step to realize material properties not possible with other methods. The IR-absorbent coating also provides for reduced heating time and reduced energy consumption. The coating composition can also be formulated without the solvent requiring evaporation, which allows the coating step to be conducted in-line, rather than off-line.

In addition, the tailored properties can be efficiently achieved by varying the composition of the IR-absorbent coating along the surface of the substrate. The different coating compositions are each infrared absorbent and provide a different emissivity coefficient along the surface, which lead to different heating rates and thus temperature gradients that achieve the tailored material properties. The tailored material properties are improved material properties which improve the formability of the substrate so that the complex shapes or features can be formed. The tailored material properties also improve the material properties of the component after exposure to IR radiation. For example, the tailored properties in the finished structural component can provide corrosion resistance, strength, elongation, durability, and/or energy absorption characteristics, depending on the ultimate application of the component.

The IR heating technique also provides several advantages over other heating techniques. The IR heat source does not contact the substrate, and thus damage to the surface of the substrate, which can be caused by conductive heating, is avoided. The IR heat source can also be incorporated into automation tooling for transferring the substrate to induce a temperature change or impose a temperature gradient between localized areas, which can also reduce process time. Furthermore, the use of an IR absorbent coating and IR heat source resulting in an increased rate of heating can avoid precipitation of intermetallic compounds in the substrate material and improve corrosion resistance and material properties during use.

Another aspect of the invention includes a metal substrate with the IR-absorbent coating, specifically the coating of iron oxide ($Fe_3O_4$) decorated multiwall carbon nanotubes. The IR-absorbent coating can be applied to a surface of a component of an engine, such as a cylinder, to increase the thermal efficiency of the engine by reducing the friction coefficient and improving material properties.

DETAILED DESCRIPTION

Figure 1:
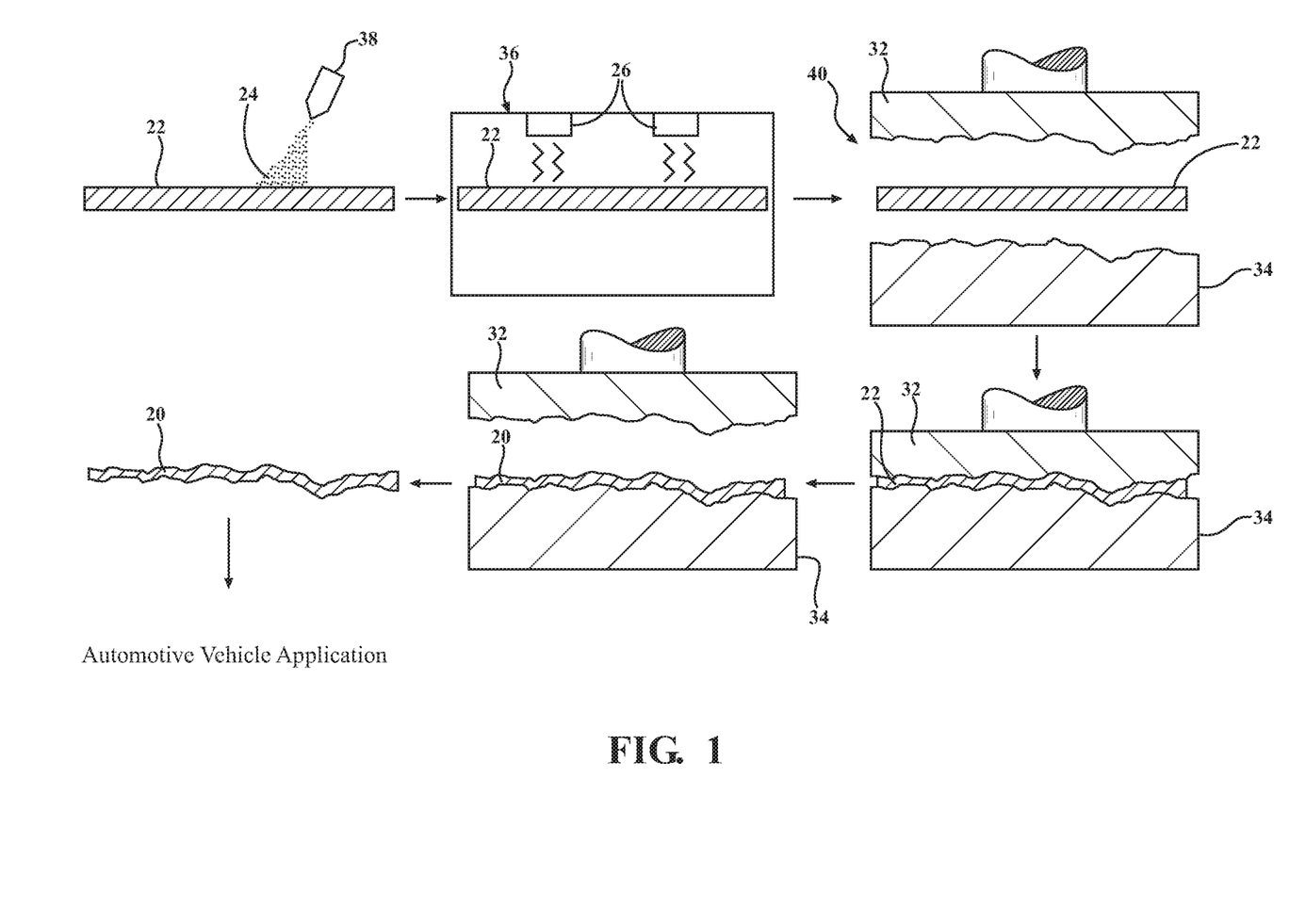
FIG. 1 illustrates a system and method of manufacturing a structural component with tailored material properties according to an exemplary embodiment of the invention.

The invention provides a method of manufacturing an automotive component 20 from a substrate 22 with tailored material properties using infrared (IR) heating and an IR-absorbent coating 24. The tailored material properties can be achieved with reduced processing time, temperatures, and energy consumption, and while avoiding surface damage to the substrate 22. FIG. 1 illustrates the system and method of manufacturing the structural component 20 according to an exemplary embodiment.

The method begins by providing the substrate 22 to be formed into the automotive component 20. The geometry of the substrate 22 depends on the desired application of the finished structural component 20. In an example embodiment, the component 20 is designed for use in an automotive vehicle application, for example a body panel, beam, pillar, or rail application. However, the component 20 could be designed for use in other automotive or non-automotive applications. The substrate 22 is typically provided in the form of a sheet or blank. The substrate 22 could also be any type of casting. In the example embodiment, the substrate 22 is a sheet having a thickness of about 1.5 mm. In addition, the substrate 22 can be provided as a plurality of units joined together, which can be later singulated to provide a plurality of the structural components 20.

The substrate 22 used to form the structural component 20 is made of a metallic material, typically a ferrous-based material, aluminum-based material, magnesium-based material, or a fiber reinforced composite material. In one exemplary embodiment, the substrate 22 is formed of an aluminum alloy with a pre-treatment currently known in the market as "Alcoa 951." Another type of aluminum alloy that can be used to form the substrate 22 is referred to as Aluminum 5182-O. In another embodiment, the substrate 22 is formed of a magnesium alloy containing 1 weight percent (wt. %) zinc, 0.1 wt. % zirconium, and 0.1 wt. % rare earth metals, which is currently known in the market as "ZEK100." In yet another embodiment, the substrate 22 is formed of steel, such as Deep Draw Quality (DDQ) stainless steel.

Figure 3:
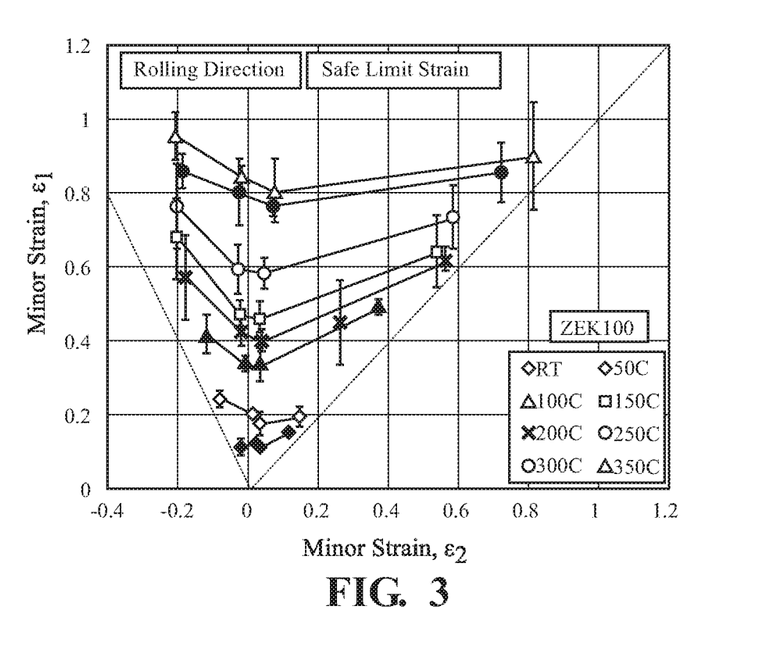
FIG. 3 is a graph illustrating minor strain and major strain of an exemplary magnesium alloy at temperatures ranging from room temperature to 350° C.
Figure 4:
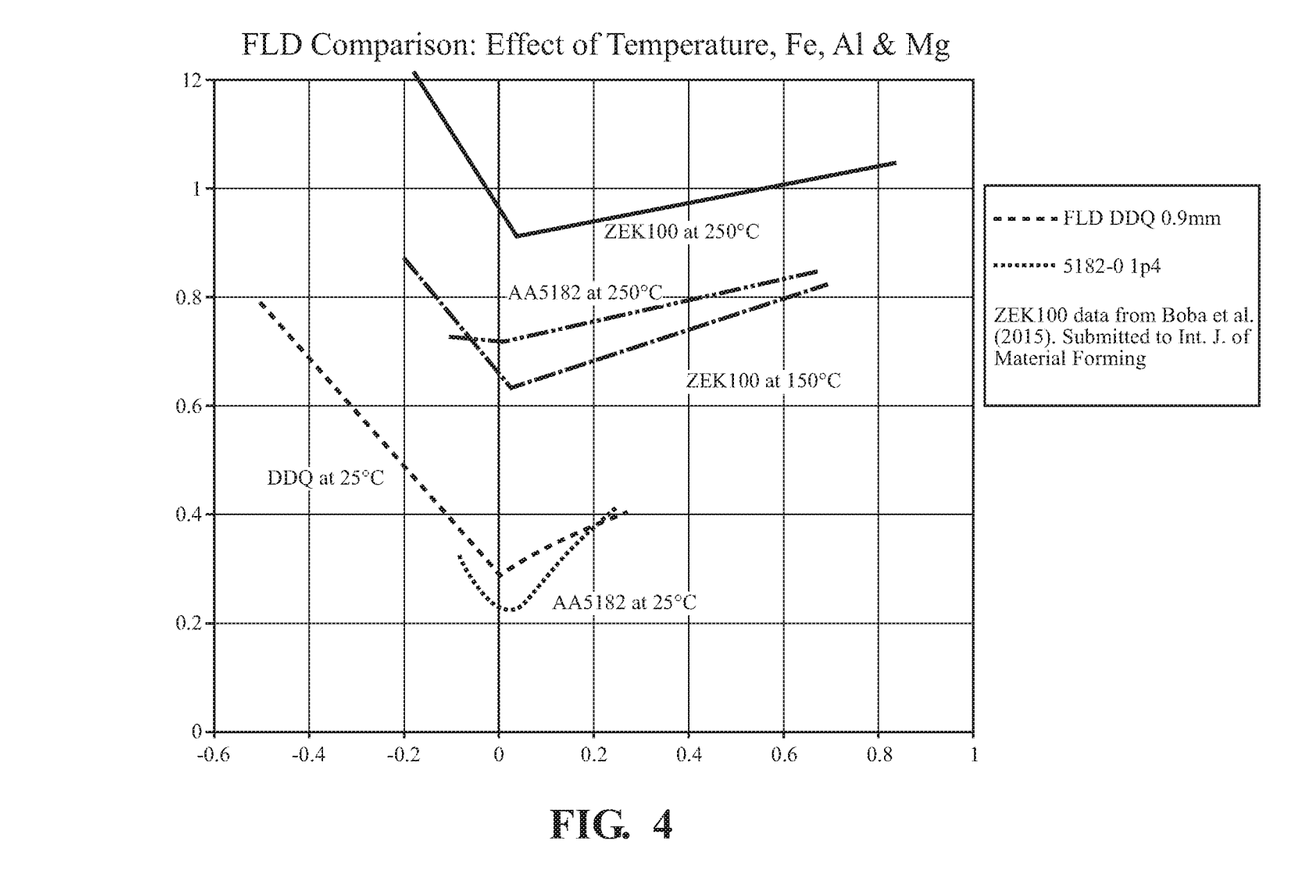
FIG. 4 is a graph illustrating minor strain and major strain of the exemplary magnesium alloy compared to an aluminum alloy and stainless steel at various temperatures.
Figure 5A:
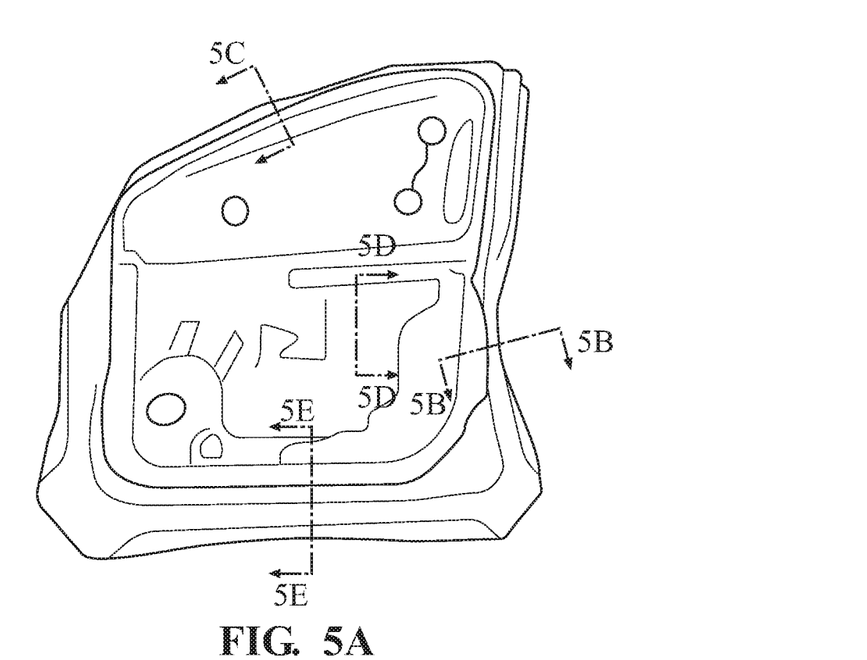
FIG. 5A illustrates a warm formed door inner panel made of an aluminum alloy.
Figure 5B:
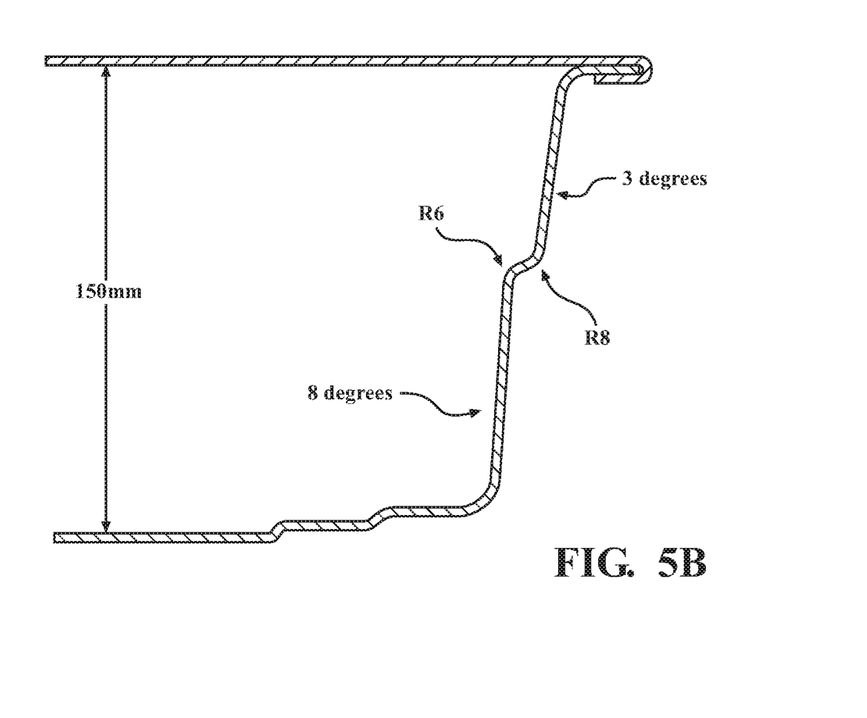
FIGS. 5B-5E are cross-sections of the panel of FIG. 5A.
Figure 5C:
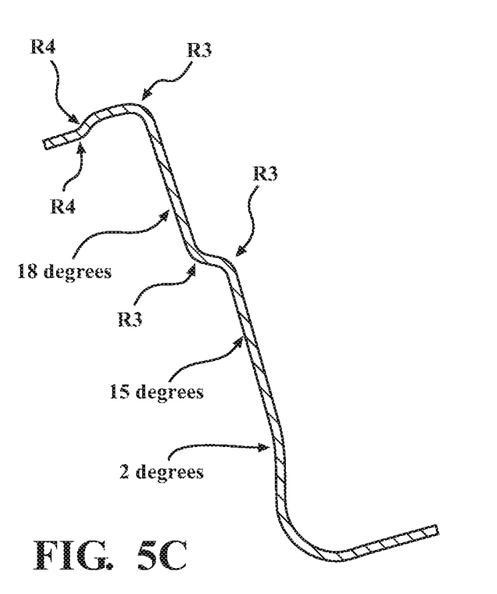
Figure 5D:
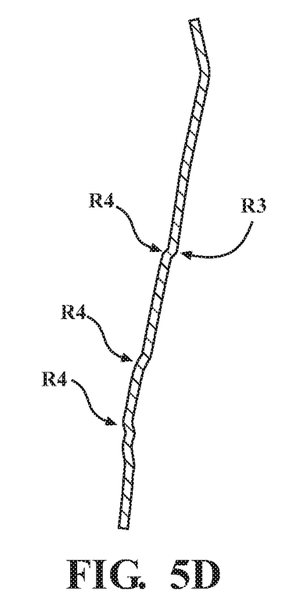
Figure 5E:
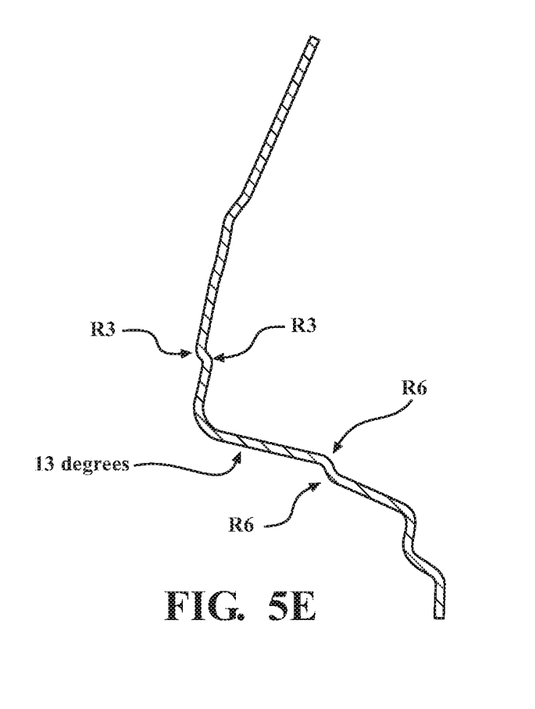

The material used to form the substrate 22 should be selected in view of the effect of temperature on the properties of the material. FIG. 3 is a graph illustrating minor strain and major strain of ZEK100 at temperatures ranging from room temperature to 350° C. FIG. 4 is a graph illustrating minor strain (x-axis) and major strain (y-axis) of ZEK100 at 150° C. and 250° C. compared to Aluminum 5182-O at 25° C. and 250° C., and Deep Draw Quality (DDQ) stainless steel at 25° C. FIGS. 5A-5E further illustrate the benefits of heat during the forming process. FIGS. 5A-5E show a substrate 22 formed of a 6022-T6 aluminum alloy having a thickness of 1.5 mm, wherein sharp radii R are achieved by warm forming the substrate 22 a temperature of 180° C. In FIGS. 5A-5E, the radius R3 is equal to a 3 mm radius, R4 is equal to a 4 mm radius, R6 is equal to 6 mm radius, and R8 is equal to a 8 mm radius, which are similar to the radii typically formed in steel parts. The radii R shown in FIGS. 5A-5E could not be achieved if the substrate 22 were formed at room temperature, because the substrate 22 would most likely crack.

The method next includes applying the IR-absorbent coating 24 having an emissivity coefficient ranging from 0.8ε to 0.98ε to the surface of the substrate 22 before heating and forming the substrate 22 into a desired shape. For example, the IR-absorbent coating 24 can be applied at a mill and prior to a coiling operation, or after a blanking operation, to facilitate in-line processing. The coating 24 can be applied to the surface of the substrate 22 by various methods. In one embodiment, embodiment, the coating 24 is provided in the form of pellets and applied to the surface of the substrate 22 by thermal spraying using a programmable numerical control device. In one embodiment, the IR-absorbent coating 24 is applied to the surface along the entire substrate 22. However, the IR-absorbent coating 24 can optionally be applied to specific areas of the substrate 22 to avoid possible contamination imposed by the IR-absorbent coating 24 to painted or welded surfaces of the substrate 22. The thickness of the coating 24 can vary depending on the size of the substrate 22 and the desired material properties. In the exemplary embodiment, the coating 24 is applied to a thickness of 0.0005 to 0.001 inches.

Figure 2:
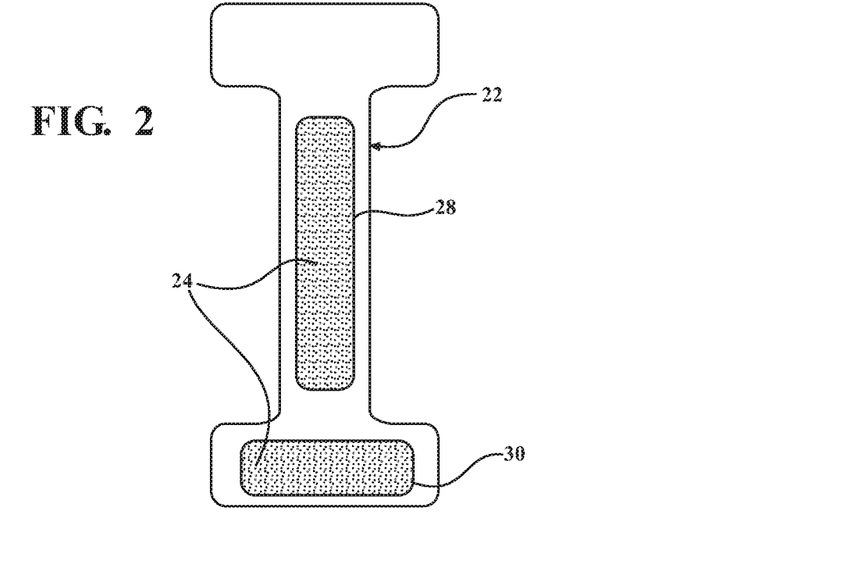
FIG. 2 is a top view of a substrate including an IR-absorbent coating according to an exemplary embodiment of the invention.

In the preferred embodiment, the IR-absorbent coating 24 includes, and typically consists of an emulsion of iron oxide ($Fe_3O_4$) decorated multiwall carbon nanotubes 24. The emulsion of iron oxide ($Fe_3O_4$) decorated multiwall carbon nanotubes 24 can be applied in the form of a coating or by in situ surface modification of the substrate 22. In one embodiment, the iron oxide ($Fe_3O_4$) decorated multiwall carbon nanotubes 24 are applied to the surface of the entire substrate 22. However, the iron oxide ($Fe_3O_4$) decorated multiwall carbon nanotubes 24 could alternatively be applied to only specific surface areas of the substrate 22 to achieve different properties in different areas of the substrate 22. FIG. 2 illustrates an example of the structure of a multiwall carbon nanotube 24.

Figure 6:
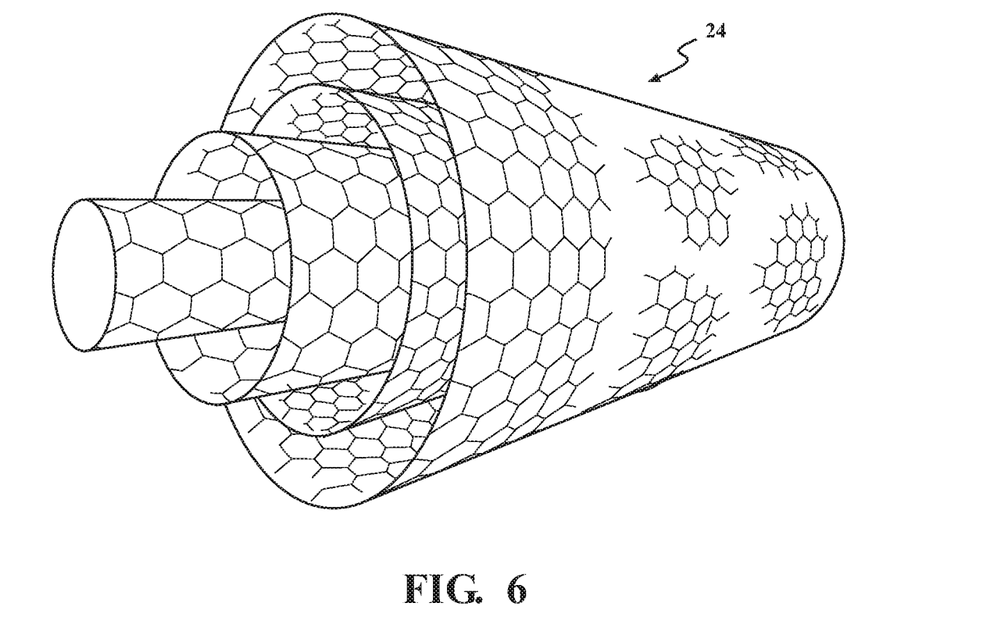
FIG. 6 illustrates the structure of a multiwall carbon nanotube according to an example embodiment.

Preferably, the method includes dispersing the iron oxide ($Fe_3O_4$) decorated multiwall carbon nanotubes 24 along the surface of the substrate 22. In the example embodiment, a magnet is used to apply an external magnetic field to disperse the iron oxide ($Fe_3O_4$) decorated multiwall carbon nanotubes 24 along the surface of the substrate 22. The method also preferably includes aligning the axes of the iron oxide ($Fe_3O_4$) decorated multiwall carbon nanotube 24 relative to the axes of the incident EM waves. A magnetic field applied by the magnet can again be used to align the iron oxide ($Fe_3O_4$) decorated multiwall carbon nanotubes 24. For example, the iron oxide ($Fe_3O_4$) decorated multiwall carbon nanotubes 24 can be disposed at the same angle as the EM waves. FIG. 6 illustrates the structure of a multiwall carbon nanotube according to an example embodiment.

The dispersion and alignment of the iron oxide ($Fe_3O_4$) decorated multiwall carbon nanotubes 24 on the surface of the substrate 22 provides numerous advantages. For example, the iron oxide ($Fe_3O_4$) decorated multiwall carbon nanotubes 24 can reduce the time required to heat the substrate 22 using radiant heat by increasing the absorption of the EM waves, increasing reflection, and thus increasing the heating rate of the substrate 22. In addition, the maximum use temperature of the iron oxide ($Fe_3O_4$) decorated multiwall carbon nanotubes 24 is greater than 270° C. The iron oxide ($Fe_3O_4$) decorated multiwall carbon nanotubes 24 can also reduce the friction coefficient of the substrate 22 at temperatures in excess of 270° C., increase the corrosion resistance of the substrate 22 at temperatures in excess of 270° C., and/or maximize the temperature associated with warm-form sheet processing.

According to another embodiment, the IR-absorbent coating 24 is formed of a wax-based or polymer-based material including various additives to achieve a desired emissivity coefficient and material properties during the heating step. In this embodiment, the wax typically used to form the coating 24 is an organic material. Alternatively, the coating 24 can be formed from a material which functions like the wax, such as certain types of polymer materials. The coating 24 of this embodiment also includes TriSilanollsooctylt POSS as a surfactant, which increases the maximum use temperature, also referred to as the functional upper temperature limit, of the coating 24 to greater than 270° C. This is an improvement over prior coatings including a silane surfactant, which limits the maximum use temperature to 270° C. or less.

The composition and amount of additives present in the wax-based or polymer-based IR-absorbent coating 24 can vary, depending on the specific material properties desired. The additives increase the emissivity coefficient and thus the infrared absorption and heating rate, as well as the cooling rate of the substrate 22 when exposed to the IR heat source 26. In the example embodiment, the additives include 25 to 50 volume percent (vol. %) of metal oxides and/or carbon variants. The metal oxides can include at least one transparent metal oxide, for example an oxide selected from the group consisting of $WO_3$, $SnO_2$, $Sb_2O_3$, or color pigment, for example $Fe_3O_4$. The carbon variant can be used in addition to, or instead of, the metal oxides. The carbon variant can also include at least one carbon pigment, for example a carbon pigment selected from the group consisting of carbon black, graphite, and graphine.

The additives can also include paramagnetic, ferromagnetic, or ferromagnetic metal oxides or borides, such as NdFeB or $Fe_3O_4$. These materials improve the ability to singulate the non-ferromagnetic substrate 22. They also enable the use of magnetic "fanning magnets," as well as magnetic field and inductive-style sensors to destack and detect double blank conditions.

The IR-absorbent coating 24 may also comprise a formulation that is typically used as a forming lubricant or an adhesion promoting coating. These types of coatings can be used if they contain a sufficient volume fraction of the additives listed above. Alternatively, the IR-absorbent coating 24 can be formulated specifically for the purpose of modifying the emissivity coefficient along the substrate 22, according to the subject invention.

The wax-based or polymer-based IR-absorbent coating 24 can also have different compositions along different zones 28, 30 of the substrate 22 to achieve the tailored material properties during the IR heating step. The coating 24 compositions applied to the different zones 28, 30 can include different additives, or the same additives in different amounts. The different coating compositions provide each zone 28, 30 of the substrate 22 with a distinct emissivity coefficient, which creates a temperature gradient across the substrate 22. The varying emissivity coefficients lead to varying heating and cooling rates, which in turn lead to material properties varying from one zone to another. FIG. 2 illustrates the IR-absorbent coating 24 applied to two zones 28, 30 of the substrate 22 according to an example embodiment. In this case, the composition of the coating 24 in the first zone 28 includes $WO_3$, and the composition of the coating 24 in the second zone 30 includes graphite. Thus, the material properties achieved during the IR heating step in the first zone 28 are different from those achieved in the second zone 30.

According to example embodiments, the coating 24 is formulated with at least one organic component which oxidizes at elevated temperature. The organic component(s) allows for removal of the coating 24 from the surface of the substrate 22 with minimal effort, and without the use of a highly acidic or highly basic pH composition.

In addition to providing the desired emissivity coefficients along the substrate 22, the IR-absorbent coating 24 also reduces the rate of oxidation along the coated surfaces of the substrate 22. The coating 24 can also be formulated to function and an adhesive promotor and/or a lubricant. During the forming step, the coating 24 provides a reduced coefficient of friction between the metal material of the substrate 22 and the dies 32, 34 used to form the substrate 22 into the predetermined shape.

The IR-absorbent coating 24 can be applied to the substrate 22 as a heat treatment method to enhance material properties. High thermal gradients result in unique material properties, which are not predicted by equilibrium phase diagrams. The known equilibrium phase diagrams assume by definition slow equilibrium cooling and homogeneity, ignoring prior thermal processing.

After applying the IR-absorbent coating 24 to the surface of the substrate 22, the method includes heating the coated substrate 22 with at least one IR heat source 26. The IR heating step does not include any physical contact with the coated substrate 22, thus avoiding potential surface damage, which can occur using conductive heating methods. The heating step can be conducted in a heating chamber 36 or another enclosed spaced using any type of IR heat source 26. The heating chamber 36 can include a single IR heat source 26, or multiple IR heat sources 26. For example, different IR heat sources 26 can be used to heat the different zones 28, 30 of the substrate 22.

Figure 7A:
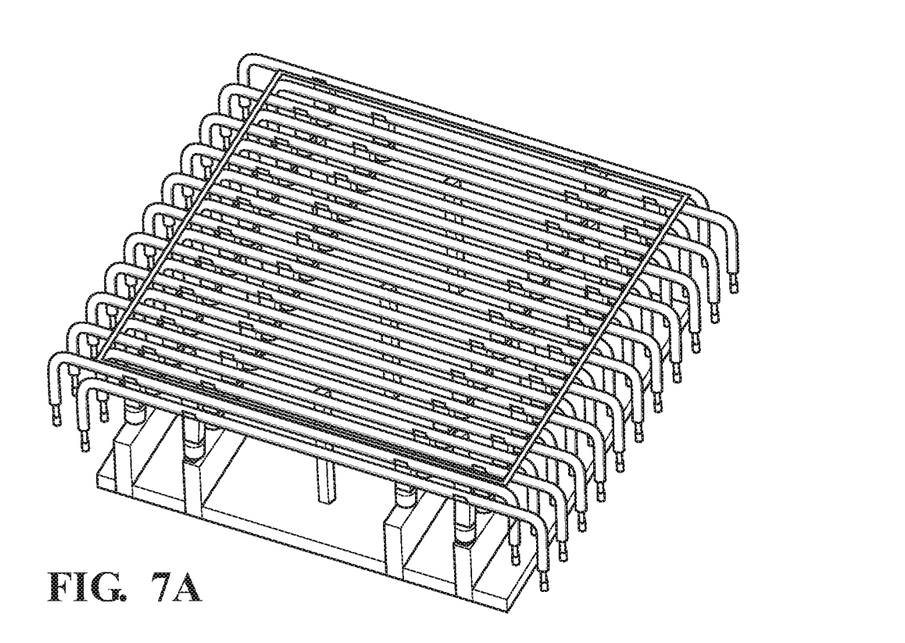
FIG. 7 illustrates an exemplary IR heat module including a plurality of IR heat sources.
Figure 7B:
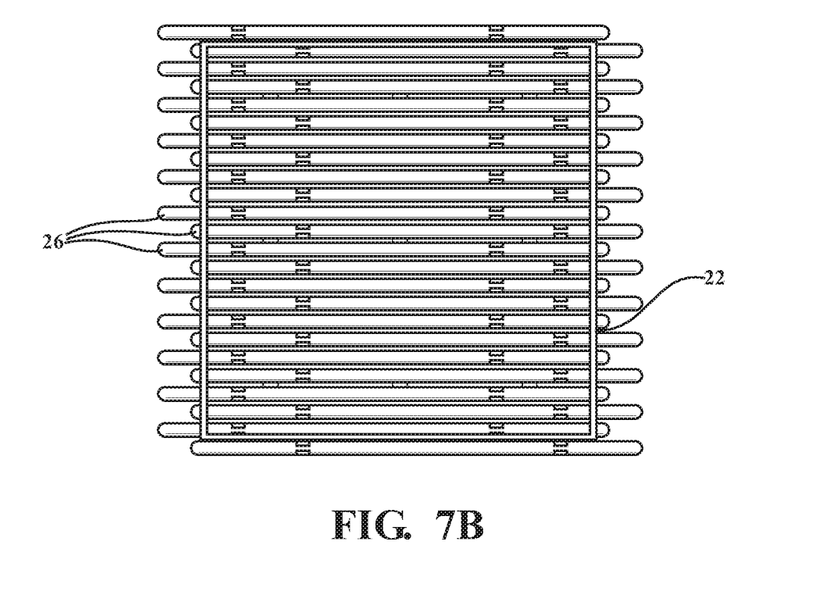
Figure 7C:
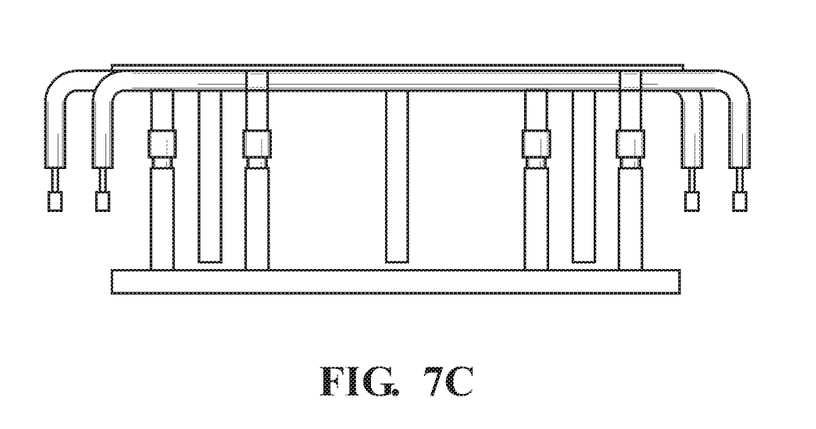

In an example embodiment, a plurality of IR heat sources 26 is provided by an IR heating module comprised of bent tube tungsten halogen quartz bulbs. The arrangement of the bulbs facilitates uniform heating by staggering the unheated zones located at the ends of the bulbs. In addition, the bent tube design and electrical connection below the heating surface minimizes the total area of the unheated zones. A large substrate 22 can be heated by arranging multiple IR heating modules, wherein the number of IR heating modules is based on the size of the substrate 22. In addition, tailored material properties in the substrate 22 can be realized by varying the intensity of each bulb or IR heating module. An example of the IR heating module and a 12"×12" substrate 22 is shown in FIG. 7. In this embodiment, the IR heating module includes twenty-four tubes each emitting 1380 Watts and 240 Volts of power. The combined power provided by the twenty four tubes is 33120 Watts As discussed above, the coating 24 applied to the surface of the substrate 22 absorbs the IR light emitted by the heat source 26. The rate of heating of the substrate 22 resulting from exposure to infrared light is a function of the power density (watts/unit area) of the IR heat source 26, and the emissivity coefficient, specific heat, and mass of the substrate 22. A typical "black body" substrate has an emissivity coefficient of 1. As discussed above, the composition of the coating 24 increases the emissivity coefficient to a value ranging from $0.8\varepsilon$ to $0.98\varepsilon$ to the surface of the substrate, which results in both an increased rate of IR absorption and increased rate of cooling. In one embodiment, the composition of the wax-based IR-absorbent coating 24 is varied to vary the emissivity coefficient along the substrate 22, and thus vary the heating rate and the resulting material properties along the substrate 22. For example, the coating 24 can be formulated and applied such that the first zone 28 of the substrate 22 shown in FIG. 2 has a faster IR absorption rate than the second zone 30. Thus, the first zone 28 reaches a higher temperature during the IR heating step, which provides a higher ductility and lower strength compared to the second zone 30.

The material properties can also be tailored by modulation of the intensity of the one or more IR heat sources 26. When the heating step includes heating the different zones 28, 30 of the substrate 22 by employing multiple IR heat sources 26, the IR heat sources 26 can be set to different power densities. If only one heat source 26 is used, the power intensity of the IR heat source 26 while heating the first zone 28 of the substrate 22 is different from the power intensity used while heating the second zone 30 of the substrate 22.

The method can also include monitoring the temperature of the substrate 22 during the IR heating step, as the temperature of the substrate 22 directly affects the material properties achieved. The temperature of the substrate 22 can be monitored to determine when the desired temperature is reached in each zone 28, 30. In the exemplary embodiment, the IR heat sources 26 are provided by an IR heating device comprised of one or more heating zones. The multiple heating zones provide the capability to vary the temperature of the substrate 22 in localized areas, for example to provide increased formability in distinct sections of the substrate 22. The IR heating device is controlled by changing the power level input to the IR hearing device based on observed temperature. The IR heating device can also be controlled to enable modulation of intensity in a "dot matrix" configuration to enable localized heating of the substrate 22.

After the IR heating step, the method next includes forming the coated substrate 22 to a predetermined shape. In the exemplary embodiment, this step includes pressing, stamping, or otherwise forming the heated substrate 22 to a predetermined shape between the dies 32, 34. The dies 32, 34 can be water cooled using cooling channels, or cooled according to other methods. The coated substrate 22 is typically still at an elevated temperature during the forming step, and thus the forming step is referred to as a hot or warm forming step.

The substrate 22 can be formed into various different shapes during the forming step, depending on the desired application of the finished structural component 20. In the exemplary embodiment, the substrate 22 is formed to a shape which includes intricate or complex features. As discussed above, the tailored material properties achieved by use of the IR-absorbent coating 24 during the IR heating step improves the formability of the substrate 22 and thus providing capability to form the complex features. For example, the temperature profile associated with the zones of the substrate 22 which are formed to the most complex shape are typically designed to have the highest ductility. The coating 24 also reduces the coefficient of friction between the metal material of the substrate 22 and the dies 32, 34.

In the example embodiment, steel stamping dies are used to form the substrate 22 into the desired shape. For example, the substrate 22 can be formed into a component 20 having a tight radii and a low R/t ratio. The R/t ratio is a way to express formability of a strip of material in terms of the ratio of the bend radius (R) to the strip thickness (t). A low R/t ratio typically equals high formability. The value of the R/t ratio is the sharpest radius that can be formed without failure. Increasing the temperature and reducing the friction coefficient of the substrate 22 also enables the formation of shapes which require a significant amount of uniform elongation in order to avoid localized thinning and fracture of the sheet substrate 22 during the forming step. In other words, the method is able to form a component 20 having a high R value. The higher heating temperature also enables the formation of components 20 with reduced thickness and weight.

The method also typically includes removing the coating 24 from the surface of the substrate 22 after forming the substrate 22 and prior to incorporating the component 20 in the desired application. A chemical composition may be used to remove the coating 24 from the substrate 22. However, if the coating 24 is formulated with at least one organic component, the coating 24 can be easily removed from the surface of the substrate 22 without the use of a highly acidic or highly basic pH composition.

As discussed above, the method of the present invention provides several advantages. First, the IR-absorbent coating 24 provides tailored material properties which improve the formability of the substrate 22. The tailored material properties are oftentimes desired in the finished automotive component 20 as well, depending on the particular application of the component 20. The IR heat source 26 does not contact the substrate 22, and thus surface damage, which can be caused by conduction heating, is avoided. The composition of the coating 24 also allows for increased temperatures during the heating step. For example, in a comparative process which employs a wax-based forming lubricant including a silane surfactant, vaporization of the silane surfactant imposes a maximum temperature of 270° C. or less, whereas the IR-absorbent coating 24 of the present invention includes iron oxide ($Fe_3O_4$) decorated multiwall carbon nanotubes or TriSilanolIsooctylt POSS as a surfactant, and thus increases the maximum use temperature.

The method of the present invention also provides for reduced process time and energy costs compared to the method which includes conduction heating and wax-based forming lubricant. In the comparative method, the wax-based forming lubricant is received in concentrate form, diluted with isopropyl alcohol solvent, and then transferred to the surface of a substrate using an absorbent roller and dried in still air prior to thermal processing. Thus, the application of the forming lubricant needs to be performed in an off-line operation, due to the time required to evaporate the alcohol solvent, which is approximately 10 minutes. The IR-absorbent coating 24 of the present invention, however, does not require the alcohol solvent and can be applied in-line by thermal spraying. In addition, the time required to achieve the desired temperature during the heating step is reduced with IR heating, compared to conduction or convective heating, and thus both the process time and energy consumption are reduced. The IR heat source 26 can also be incorporated into automation tooling for transferring the substrate 22 to induce a temperature change or impose a temperature gradient between localized areas, which can also reduce process time. Furthermore, paramagnetic, ferromagnetic, or ferromagnetic metal oxide materials can be added to the coating 24 to improve the ability to singulate the non-ferromagnetic materials used to form the substrate 22.

The invention also provides a system capable of implementing the method described above. In the exemplary embodiment, the system includes a device 38, such as a thermal spray device, for applying the coating 24 to the substrate 22, an IR heating source 36 for heating the coated substrate 22, and a forming apparatus 40 including the pair of dies 32, 34 for forming the heated and coated substrate 22 to the predetermined shape. FIG. 1 illustrates the components of the system, according to an exemplary embodiment.

Another aspect of the invention is a coated substrate 22 which can be heated and formed according to the method desired above. The substrate 22 is formed of a metal material, typically a ferrous-based, aluminum-based, magnesium-based material, or fiber reinforced composite material. The IR-absorbent coating 24 is applied to one or more surfaces of the substrate 22 to achieve tailored material properties during the heating step and improve formability of the substrate 22 during the forming step. As discussed above, the IR-absorbent coating 24 includes iron oxide ($Fe_3O_4$) decorated multiwall carbon nanotubes, or a wax-based or polymer-based material including TriSilanollsooctylt POSS and various additives to achieve the desired emissivity coefficient and material properties during the heating step.

Figure 8:
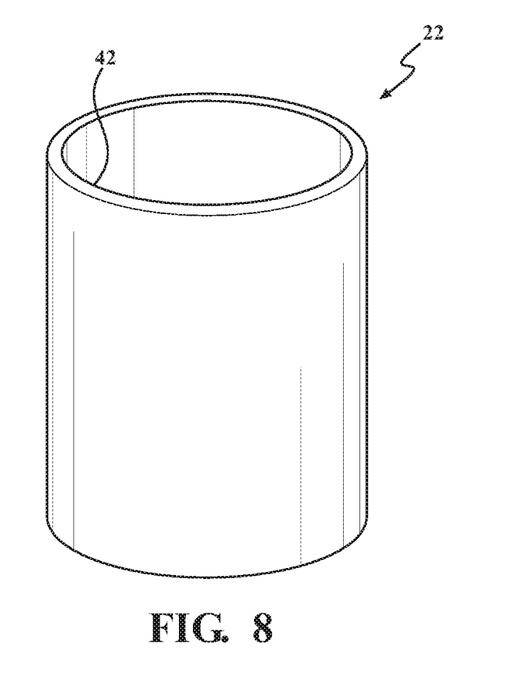
FIG. 8 illustrates the coated substrate in the form of a cylinder liner according to an example embodiment.

Alternatively, the coated substrate 22 can be in the form of at least one engine component, for example a cylinder for an internal combustion engine, as shown in FIG. 8. The IR-absorbent coating 24 can be applied to an inner surface 42 of the cylinder to increase the thermal efficiency of the engine by reducing the friction coefficient and improving material properties. The IR-absorbent coating 24 also enables the use of an aluminum-based, magnesium-based, or fiber reinforced composite material. According to this embodiment, the coating 24 is preferably formed of the iron oxide decorated multiwall carbon nanotubes.

EXPERIMENT

An experiment was conducted to evaluate the method of manufacturing an automotive component 20 with tailored material properties using infrared (IR) heating and a wax-based IR-absorbent coating 24, as described above. The experiment included providing a plurality of substrates 22, including substrates 22 formed of an aluminum-based material and substrates 22 formed of a magnesium-based material. A group of those substrates 22 was coated with the IR-absorbent coating 24. The composition of the IR-absorbent coating 24 included a removable wax-based organic lubricant and $Fe_3O_4$ oxide. The composition of the IR-absorbent coating 24 varied along the surface of the substrate 22 by varying the level of $Fe_3O_4$ oxide additions in order to achieve different (tailored) material properties in different portions of the substrate 22. Another group of the substrates 22 remained uncoated for purposes of comparison.

The heating and cooling rate of the coated and uncoated substrates 22 was then evaluated using an IR camera. The evaluation step included heating the substrates 22 for 3.6 seconds in a commercially available IR heating system, which exposed the substrates 22 to 200 watts/in$^2$ of IR short wave radiation using tungsten halogen quartz lamps. It was observed that the substrates 22 coated with the IR-absorbent coating 24 had a faster heating and cooling rate compared to the uncoated substrates 22. It was also determined that the coated substrates 22 achieved tailored material properties without damage to the surface of the substrate 22.

Obviously, many modifications and variations of the present invention are possible in light of the above teachings and may be practiced otherwise than as specifically described while within the scope of the claims.

What is claimed is:

1. A method of manufacturing a structural component, comprising the steps of:
    applying an infrared-absorbent coating to a surface of a substrate formed of a metal material, wherein the infrared-absorbent coating includes iron oxide ($Fe_3O_4$) decorated multiwall carbon nanotubes;
    heating the coated substrate with an infrared heat source;
    aligning the axes of the iron oxide ($Fe_3O_4$) decorated multiwall carbon nanotubes with the axes of incident electromagnetic waves provided by the infrared heat source; and
    forming the heated and coated substrate between a pair of dies.

2. The method of claim 1, wherein the infrared-absorbent coating has an emissivity coefficient ranging from 0.8ε to 0.98ε.

3. The method of claim 1, wherein the step of aligning the axes of the iron oxide ($Fe_3O_4$) decorated multiwall carbon nanotubes with the axes of the incident electromagnetic waves includes applying a magnet to the iron oxide ($Fe_3O_4$) decorated multiwall carbon nanotubes.

4. The method of claim 1, wherein the heating step includes heating the coated substrate to a temperature greater than 270° C.

5. The method of claim 1, wherein the forming step includes shaping the substrate into a body panel, beam, pillar, or rail for an automotive vehicle.

6. The method of claim 1, wherein the heating step includes heating different zones of the substrate to different temperatures.

7. The method of claim 1, wherein the forming step includes warm forming or hot forming.

8. The method of claim 1, wherein the step of applying the coating includes applying the coating to a thickness of 0.0005 to 0.001 inches.

9. A method of manufacturing a structural component, comprising the steps of:
    applying an infrared-absorbent coating to a surface of a substrate formed of a metal material, wherein the coating includes a wax-based or polymer-based material, TriSilanollsooctylt POSS, and additives in an amount of 25 to 50 vol. %, based on the total volume of the coating, wherein the additives include metal oxides, metal borides, and/or carbon variants;
    heating the coated substrate with an infrared heat source; and
    forming the heated and coated substrate between a pair of dies.

10. The method of claim 9, wherein the additives include at least one metal oxide or boride selected from the group consisting of $WO_3$, $SnO_2$, $Sb_2O_3$, $Fe_3O_4$, and NdFeB; and/or at least one carbon variant selected from the group consisting of carbon black, graphite, and graphine.

11. The method of claim 9, wherein the step of applying the coating to the surface of the substrate includes applying different compositions along different zones of the substrate.

12. A structural component, comprising:
a substrate formed of a metal material;
a coating applied to a surface of the substrate;
the coating including iron oxide ($Fe_3O_4$) decorated multiwall carbon nanotubes, and the axes of the iron oxide ($Fe_3O_4$) decorated multiwall carbon nanotubes being aligned.

13. The structural component of claim 12, wherein the substrate is a component of an internal combustion engine, and the metal material of the substrate is formed from an aluminum-based material, a ferrous-based material, or magnesium-based material.

14. The structural component of claim 12, wherein the coating has an emissivity coefficient ranging from $0.8\varepsilon$ to $0.98\varepsilon$.

15. The structural component of claim 12, wherein the coating is applied to a thickness of 0.0005 to 0.001 inches.

16. A structural component, comprising:
a substrate formed of a metal material;
a coating applied to a surface of the substrate, wherein the coating includes a wax-based or polymer-based material, TriSilanollsooctylt POSS, and additives in an amount of 25 to 50 vol. %, based on the total volume of the coating, wherein additives include metal oxides, metal borides, and/or carbon variants.

17. The structural component of claim 16, wherein the additives include at least one metal oxide or boride selected from the group consisting of $WO_3$, $SnO_2$, $Sb_2O_3$, $Fe_3O_4$, and NdFeB; and/or at least one carbon variant selected from the group consisting of carbon black, graphite, and graphine.

18. The structural component of claim 16, wherein different compositions of the coating are applied along different zones of the substrate.

* * * * *